United States Patent
Zhao

(10) Patent No.: US 12,039,714 B2
(45) Date of Patent: Jul. 16, 2024

(54) INSPECTION METHOD AND INSPECTION MACHINE FOR DISPLAY PANEL

(71) Applicants: HKC CORPORATION LIMITED, Shenzhen (CN); CHONGQING HKC OPTOELECTRONICS TECHNOLOGY CO., LTD., Chongqing (CN)

(72) Inventor: Wenqin Zhao, Chongqing (CN)

(73) Assignees: HKC CORPORATION LIMITED, Shenzhen (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 17/289,229

(22) PCT Filed: Mar. 17, 2020

(86) PCT No.: PCT/CN2020/079683
§ 371 (c)(1),
(2) Date: Apr. 27, 2021

(87) PCT Pub. No.: WO2020/192494
PCT Pub. Date: Oct. 1, 2020

(65) Prior Publication Data
US 2022/0012864 A1    Jan. 13, 2022

(30) Foreign Application Priority Data
Mar. 22, 2019   (CN) .......................... 201910219933.2

(51) Int. Cl.
*G06T 7/00*     (2017.01)
*G01N 21/89*    (2006.01)

(52) U.S. Cl.
CPC ......... *G06T 7/001* (2013.01); *G01N 21/8901* (2013.01)

(58) Field of Classification Search
CPC ........... G06T 7/001; G06T 2207/10016; G06T 2207/20032; G06T 2207/20216;
(Continued)

(56) References Cited

U.S. PATENT DOCUMENTS

2007/0071304 A1* 3/2007 Kuchii .................. G06T 7/0004
                                                    382/141
2008/0107328 A1  5/2008 Chen et al.
(Continued)

FOREIGN PATENT DOCUMENTS

CN      1928535 A     3/2007
CN    103792699 A     5/2014
(Continued)

OTHER PUBLICATIONS

Yu Zhou, the International Searching Authority written comments, dated Aug. 2020, CN.
(Continued)

*Primary Examiner* — Samir A Ahmed

(57) ABSTRACT

This application discloses an inspection method and an inspection machine for a display panel. The inspection method includes the steps of: taking a picture of a to-be-inspected display panel to obtain a to-be-inspected image of the to-be-inspected display panel; removing high-frequency information in the to-be-inspected image to obtain a high-frequency-removed image; calculating a difference between the to-be-inspected image and the high-frequency-removed image to obtain a difference image; making a determination regarding the difference image by comparing the difference image with a preset threshold, determining that the display panel fails the inspection if the difference image exceeds the preset threshold, and determining that the display panel passes the inspection if the difference image does not exceed the preset threshold.

11 Claims, 6 Drawing Sheets

(58) Field of Classification Search
CPC ........... G06T 5/002; G06T 5/004; G06T 5/50; G06T 2207/20224; G06T 2207/30121; G06T 7/0004; G06T 5/00; G01N 21/8901
See application file for complete search history.

(56) References Cited

U.S. PATENT DOCUMENTS

2008/0205747 A1* 8/2008 Kuchii .................. G06T 7/0004
382/149
2015/0269895 A1* 9/2015 Kao ..................... G09G 3/3426
345/690

FOREIGN PATENT DOCUMENTS

| CN | 105913419 A | * | 8/2016 |
| CN | 106556940 A | | 4/2017 |
| CN | 109828394 A | | 5/2019 |
| KR | 20140087606 A | | 7/2014 |

OTHER PUBLICATIONS

Yu Zhou, the International Searching Report, dated Aug. 2020, CN.
Kim Seong Hoon. "Region Mura Detection using Efficient High Pass Filtering based on Fast Average Operation" 17th IFAC World Congress (IFAC 08), (Jul. 11, 2008), ISSN: 0, 8190-8195.

* cited by examiner

INSPECTION METHOD AND INSPECTION MACHINE FOR DISPLAY PANEL

CROSS REFERENCE OF RELATED PLICATIONS

This application claims the priority to the Chinese Patent Application No. CN201910219933.2, filed with National Intellectual Property Administration, PRC on Mar. 22, 2019 and entitled "INSPECTION METHOD AND INSPECTION MACHINE FOR DISPLAY PANEL", which is incorporated herein by reference in its entirety.

TECHNICAL FIELD

This application relates to the field of display technologies, and in particular, to an inspection method and an inspection machine for a display panel.

BACKGROUND

The statements herein only provide background information related to this application, and do not necessarily constitute the prior art.

Visual inspection is to perform measurement and determination through machines instead of human eyes. Visual inspection is to transform a captured target into image signals through two machine vision products (that is, image capturing devices such as a CMOS image sensor and a charge coupled device (CCD) image sensor) and transmit the image signals to a dedicated image processing system, which are transformed into digital signals according to information such as pixel distribution, brightness, color, and the like. The image system performs various operations on the signals to extract characteristics of the target, and then controls actions of a device on site according to a determining result, which is a valuable mechanism for production, assembly, or packaging. The visual inspection has an inestimable value in functions of inspecting defects and preventing defective products from being delivered to consumers.

A feature of machine-vision-based inspection is to improve flexibility and automation of production. In some dangerous working environments that are not suitable for manual operation or occasions in which artificial vision does not meet requirements, machine vision is usually used to replace artificial vision. However, the machine vision still has low efficiency in image noise reduction during defect inspection of a display panel.

SUMMARY

This application is intended to provide an inspection method and an inspection machine for a display panel to improve efficiency of image noise reduction.

This application discloses an inspection method for a display panel. The inspection method includes steps of:
  taking a picture of a to-be-inspected display panel to obtain a to-be-inspected image of the to-be-inspected display panel;
  removing high-frequency information in the to-be-inspected image to obtain a high-frequency-removed image;
  calculating a difference between the to-be-inspected image and the high-frequency-removed image to obtain a difference image; and
  making a determination regarding the difference image by comparing the difference image with a preset threshold, determining that the display panel fails the inspection if the difference image exceeds the preset threshold; and determining that the display panel passes the inspection if the difference image does not exceed the preset threshold.

This application further discloses an inspection method for a display panel. The inspection method includes steps of:
  taking a picture of a to-be-inspected display panel to obtain a to-be-inspected image of the to-be-inspected display panel;
  removing high-frequency information in the to-be-inspected image to obtain a high-frequency-removed image;
  calculating a difference between the to-be-inspected image and the high-frequency-removed image to obtain a difference image;
  making a determination regarding the difference image by comparing the difference image with a preset threshold, determining that the display panel fails the inspection if the difference image exceeds the preset threshold; and determining that the display panel passes the inspection if the difference image does not exceed the preset threshold:
  searching for a brightness value of the pixel in the difference image which has a maximum brightness;
  calculating, according to the brightness value of the pixel having the maximum brightness, an image magnification coefficient for enhancing the difference image to a maximum brightness value;
  enhancing the difference image according to the image magnification coefficient to obtain an enhanced image; and
  determining the position where poor displaying occurs according to the enhanced image.

This application further discloses an inspection machine. The inspection machine includes an image acquiring circuit, a filtering circuit, a determining circuit, and a difference calculating circuit. The image acquiring circuit is configured to take a picture of a to-be-inspected display panel to obtain a to-be-inspected image of the to-be-inspected display panel. The filtering circuit is configured to remove high-frequency information in the to-be-inspected image obtained by the image acquiring circuit to obtain a high-frequency-removed image. The difference calculating circuit is configured to calculate a difference between the to-be-inspected image obtained by the image acquiring circuit and the high-frequency-removed image obtained by the filtering circuit to obtain a difference image. The determining circuit is configured to make a determination regarding the difference image of the difference calculating circuit by comparing each pixel the difference image with each pixel in the preset reference image, determine that the display panel fails the inspection if the difference image exceeds the image value of the preset reference image, and determine that the display panel passes the inspection if the difference image does not exceed the image value of the preset reference image.

During defect inspection on the to-be-inspected display panel, the to-be-inspected image of the to-be-inspected display panel is obtained, high frequency removal is performed on the to-be-inspected image to obtain the high-frequency-removed image, the high-frequency-removed image is subtracted from the to-be-inspected image to obtain the difference image, and then the difference image is compared with the preset threshold, so that poor displaying that cannot be observed by human eyes is more accurately inspected, and it can be determined whether the to-be-inspected display panel meets a qualification standard, greatly improving an inspection speed and inspection accuracy.

BRIEF DESCRIPTION OF DRAWINGS

The included accompanying drawings are used to provide further understanding of the embodiments of the present application, constitute a part of the specification, and are used to illustrate implementations of the present application and explain the principle of the present application together with literal descriptions. Apparently, the accompanying drawings in the following description show merely some embodiments of this application, and a person of ordinary skill in the art may still derive other drawings from these accompanying drawings without creative efforts. In the figures.

DETAILED DESCRIPTION OF EMBODIMENTS

It should be understood that, the terms used herein, specific structures, and functional details disclosed herein are intended to describe specific embodiments and merely representative. However, this application may be specifically implemented in many alternative forms, and should not be construed as being limited to the embodiments set forth herein.

In the descriptions of this application, the terms such as "first" and "second" are used only for the purpose of description, and should not be understood as indicating or implying the relative importance or implicitly specifying the number of the indicated technical features. Therefore, unless otherwise stated, a feature defined to be "first" or "second" may explicitly or implicitly include one or more features. "A plurality of" refers to two or more. The terms "include", "comprise" and any variant thereof are intended to cover non-exclusive inclusion. One or more other features, integers, steps, operations, elements, components, and/or a combination thereof may be present or added.

In addition, orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating that the mentioned apparatus or component must have a particular orientation or must be constructed and operated in a particular orientation. Therefore, such terms should not be construed as limiting of this application.

In addition, unless otherwise clearly specified and defined, terms such as "installation", "interconnection", and "connection" shall be understood in a broad sense, for example, may be a fixing connection, a detachable connection, an integral connection, a mechanical connection, an electrical connection, a direct connection, an indirect connection by using an intermediate medium, or communication between interiors of two components. A person of ordinary skill in the art may understand specific meanings of the terms in this application according to specific situations.

This application is described in detail below with reference to the accompanying drawings and optional embodiments.

Figure 1:
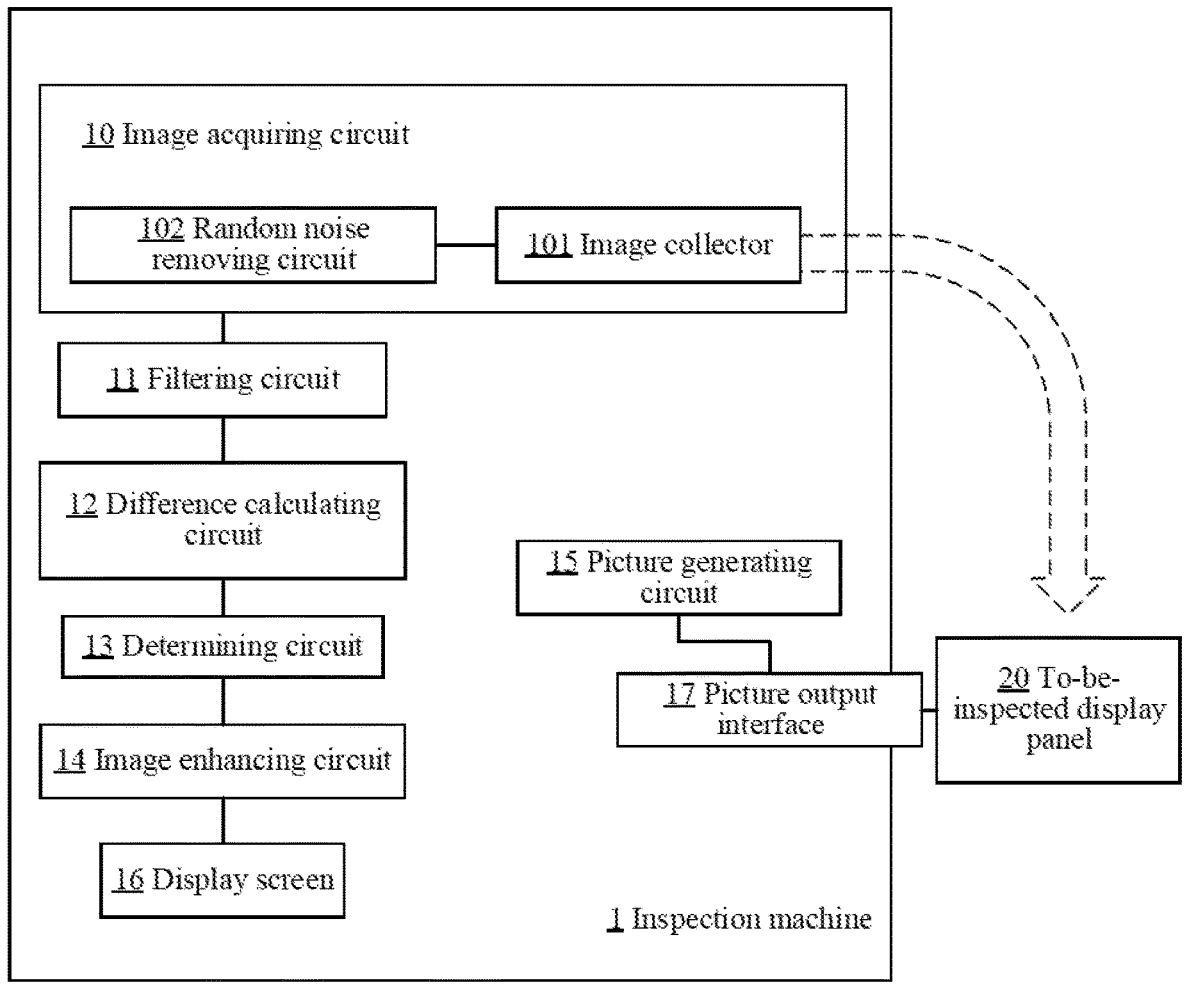
FIG. 1 is a schematic diagram of an inspection machine for a display panel according to an embodiment of this application.

As shown in FIG. 1, an embodiment of this application discloses an inspection machine 1. The inspection machine includes: an image acquiring circuit 10, a filtering circuit 11, a difference calculating circuit 12, and a determining circuit 13. The image acquiring circuit 10 takes a picture of a to-be-inspected display panel to obtain a to-be-inspected image of the to-be-inspected display panel. The filtering circuit 11 removes high-frequency information in the to-be-inspected image obtained by the image acquiring circuit 10 to obtain a high-frequency-removed image. The determining circuit 13 calculates a difference between the to-be-inspected image obtained by the image acquiring circuit 10 and the high-frequency-removed image obtained by the filtering circuit 11 to obtain a difference image of the difference calculating circuit 12. A determination is made regarding the difference image of the difference calculating circuit 12 by comparing the difference image with a preset threshold. The display panel is determined to fail the inspection if the difference image exceeds the preset threshold, and the display panel is determined to pass the inspection if the difference image does not exceed the preset threshold.

In addition, the inspection machine 1 includes a picture generating circuit 15 that generates a to-be-inspected image. The picture generating circuit is configured to be connected to the to-be-inspected display panel 20 to control the to-be-inspected display panel 20 to display a picture output interface 17 of the to-be-inspected image.

The image acquiring circuit 10 may include an image collector 101 and a random noise removing circuit 102. The random noise removing circuit 102 controls the image collector 101 to acquire a plurality of original images, calculates a mean value of the plurality of original images, and removes random noise of the original images to obtain a random-noise-removed image as the to-be-inspected image. The image collector 101 may be a camera or a video camera. Certainly, other capturing devices may also be selected.

Specifically, the inspection machine 1 may further include: an image enhancing circuit 14 and a display screen 16. The image enhancing circuit enhances the difference image in the determining circuit 13 to obtain an enhanced image, and the display screen 16 displays the enhanced image in the image enhancing circuit 14 to assist determination.

Certainly, if the image enhancing circuit 14 is not disposed for the inspection machine, the display screen 16 may be connected to the determining circuit 13 to display the difference image in the determining circuit 13 to assist inspection personnel in the inspection on the to-be-inspected display panel 20.

Figure 2:
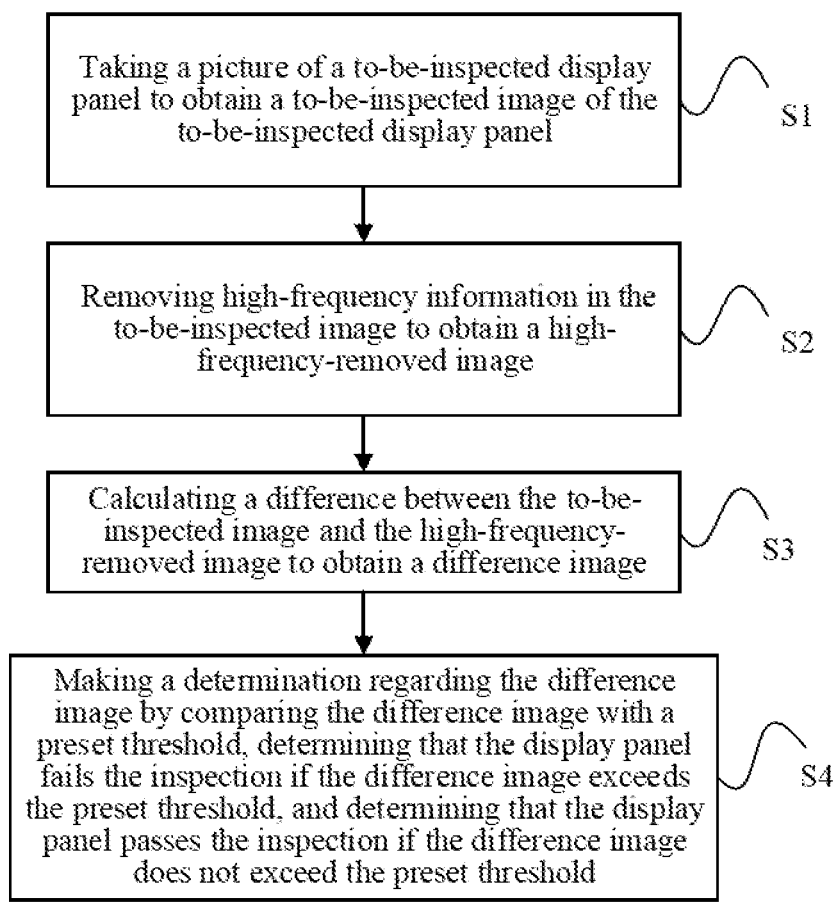
FIG. 2 is a schematic diagram of an inspection method for a display panel according to an embodiment of this application.

As shown in FIG. 2, another embodiment of this application discloses a method for inspecting a display panel by using the above inspection machine. The method includes the steps of:

S1: taking a picture of a to-be-inspected display panel to obtain a to-be-inspected image of the to-be-inspected display panel;

S2: removing high-frequency information in the to-be-inspected image to obtain a high-frequency-removed image:

S3: calculating a difference between the to-be-inspected image and the high-frequency-removed image to obtain a difference image;

S4: making a determination regarding the difference image by comparing the difference image with a preset threshold, determining that the display panel fails the inspection if the difference image exceeds the preset threshold; and determining that the display panel passes the inspection if the difference image does not exceed the preset threshold.

During defect inspection on the to-be-inspected display panel, the to-be-inspected image of the to-be-inspected display panel is obtained, high frequency removal is performed on the to-be-inspected image to obtain the high-frequency-removed image, the high-frequency-removed image is subtracted from the to-be-inspected image to obtain the difference image, and then the difference image is compared with a preset reference image, so that poor displaying that cannot be observed by human eyes is more accurately inspected, and it can be determined whether the to-be-inspected display panel meets a qualification standard, greatly improving an inspection speed and inspection accuracy.

Figure 3:
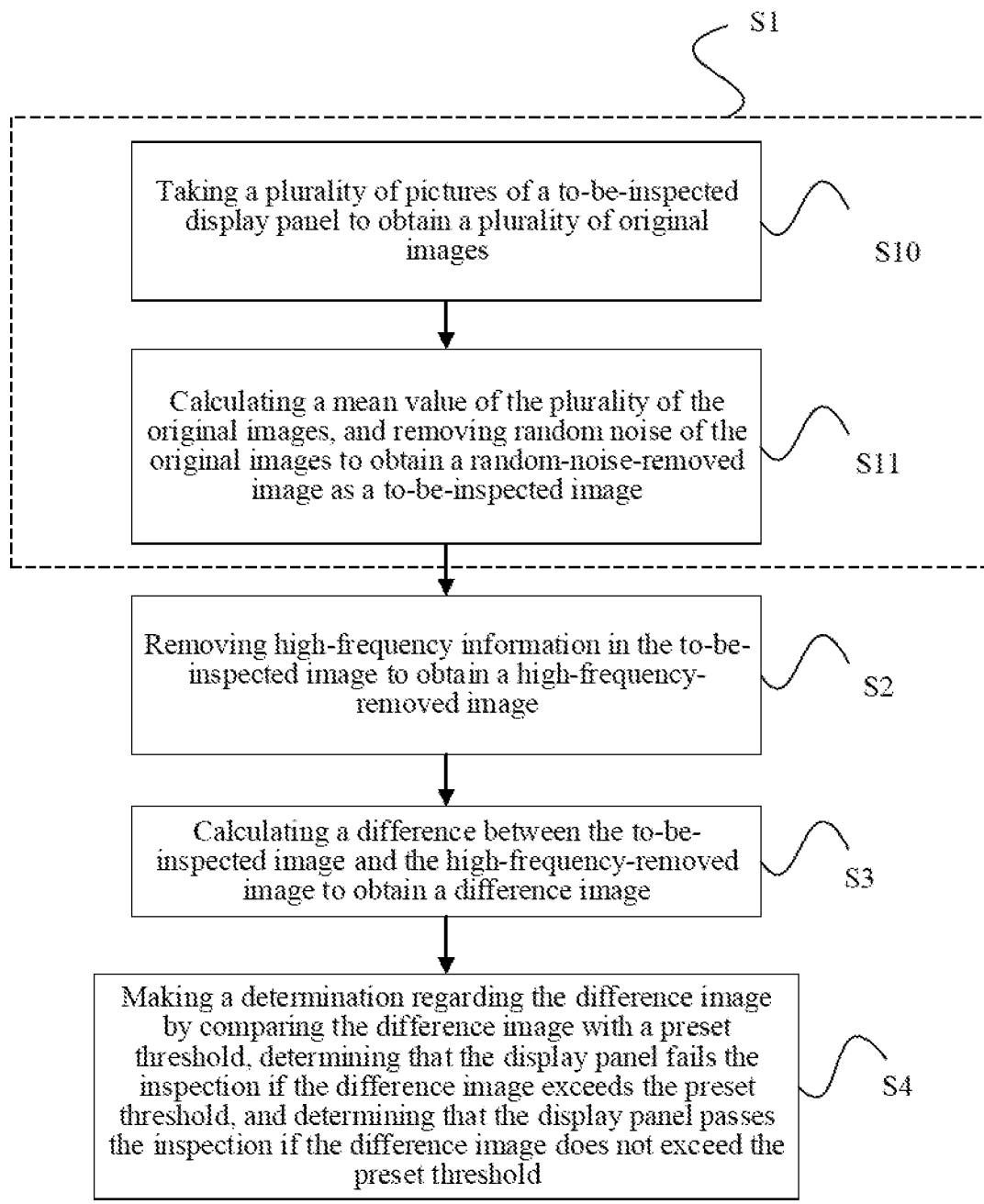
FIG. 3 is a schematic diagram of an inspection method for a display panel according to an embodiment of this application.

Specifically, referring to FIG. 3, FIG. 3 is a schematic diagram of an inspection method for a display panel according to an embodiment of this application. The step of taking a picture of a to-be-inspected display panel to obtain a to-be-inspected image of the to-be-inspected display panel includes:

S10: taking a plurality of pictures of the to-be-inspected display panel to obtain a plurality of original images; and S11: calculating a mean value of the plurality of original images, and removing random noise of the original images to obtain a random-noise-removed image as the to-be-inspected image.

Since the process of acquiring the to-be-inspected image may be affected by an external light source, the original image is usually mixed with external noise. For example, assuming that an original image $F(x,y)$ is an image obtained after a random-noise-removed image $f(x,y)$ is mixed with additive random noise $t(x,y)$, a relationship between the original image, and the random-noise-removed image and the additive noise may be expressed by the following equation:

$$F(x,y)=f(x,y)+t(x,y).$$

Therefore, by taking a plurality of pictures to obtain a plurality of original images and then averaging an appropriate number of original images, the pollution of the external random noise $t(x,y)$ can be reduced or even eliminated, thereby obtaining the random-noise-removed image $f(x, y)$. In this way, during subsequent inspection on the display panel, the random-noise-removed image $f(x, y)$ is used as the to-be-inspected image, reducing an error caused by surroundings.

In the step of removing high-frequency information in the to-be-inspected image to obtain a high-frequency-removed image, low-frequency filtering is performed on the to-be-inspected image, and the low-frequency filtering is mean filtering. Specifically, 3*3 pixels in the to-be-inspected image are used as a pixel cell, and mean filtering is performed on all of the pixel cells of the pixels of the to-be-inspected image.

For example, 3*3 pixels in a to-be-inspected image $F11(x,y)$ are used as a pixel cell. The pixel cell may be calculated by using the following formula:

$$F12(x,y)=(F11(x-1,y-1)+F11(x,y-1)+F11(x+1,y-1)+\\F11(x-1,y)+F11(x,y)+F11(x+1,y)+F11(x-1,y+1)+F11(x,y+1)+F11(x+1,y+1))/9.$$

The following table presents a pixel list of 3*3 pixels as a pixel cell.

| x − 1, y − 1 | x, y − 1 | x + 1, y − 1 |
| x − 1, y     | x, y     | x + 1, y     |
| x − 1, y + 1 | x, y + 1 | x + 1, y + 1 |

Certainly, those skilled in the art may obtain an image obtained after the high frequency removal for the to-be-inspected image through other mean operations according to requirements, such as median filtering, adaptive Wiener filtering, wavelet denoising, and the like.

In the step of calculating a difference between the to-be-inspected image and the high frequency-removed image to obtain a difference image, the high-frequency-removed image is subtracted from the to-be-inspected image to obtain the difference image. This is the simplest way to calculate the difference. Specifically, the difference image is compared with a preset threshold. The display panel is determined to fail the inspection if the difference image exceeds the preset threshold. The display panel is determined to pass the inspection if the difference image does not exceed the preset threshold. The preset threshold is a threshold matrix, and thresholds in the threshold matrix correspond to pixels in the difference image in a one-to-one manner. Each of the pixels in the difference image is compared with a threshold in the threshold matrix which corresponds to the pixel; the display panel is determined to fail the inspection if the difference image exceeds the threshold in the threshold matrix which corresponds to the pixel; and the display panel is determined to pass the inspection if the pixel in the difference image does not exceed the threshold in the threshold matrix which corresponds to the pixel. For example, the difference image is expressed as $F2(x,y)$, and the preset threshold is expressed as $U(x,y)$. All of the pixels of the difference image $F2(x,y)$ are compared with the preset threshold $U(x,y)$. If $F2(x,y)>U(x,y)$, the display panel is determined to pass the inspection, or otherwise, the to-be-inspected display panel is determined to fail the inspection. The preset threshold may be a fixed value, and thresholds of all of the pixels of the display panel are the same. Certainly, those skilled in the art may flexibly adjust the thresholds according to their requirements.

Figure 4:
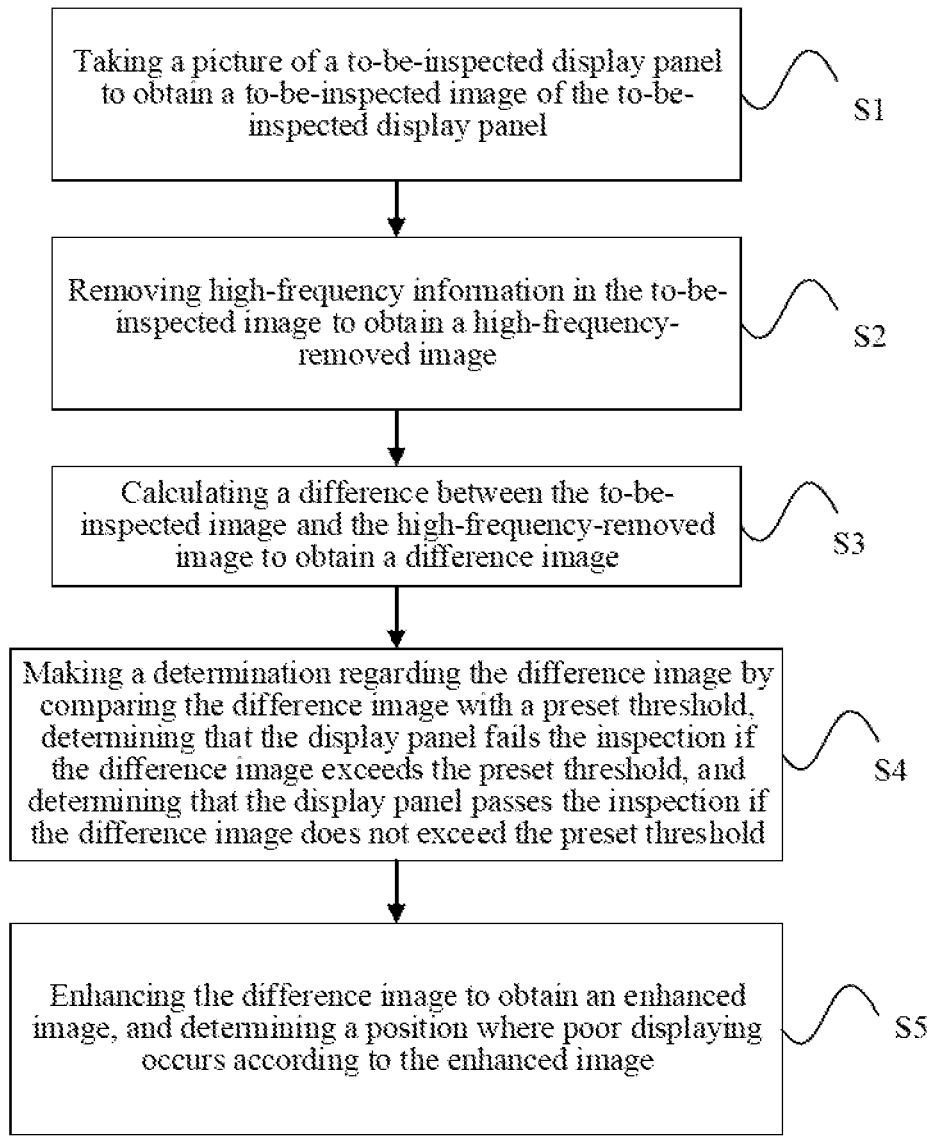
FIG. 4 is a schematic diagram of an inspection method for a display panel according to an embodiment of this application.

Referring to FIG. 4, FIG. 4 is a schematic diagram of an inspection method for a display panel according to an embodiment of this application. After a step of making a determination regarding the difference image by comparing the difference image with a preset threshold, determining that the display panel fails the inspection if the difference image exceeds the preset threshold, and determining that the display panel passes the inspection if the difference image does not exceed the preset threshold, the method further includes the step of: step S5 of enhancing the difference image to obtain an enhanced image, and determining a position where poor displaying occurs according to the enhanced image.

For the display panel determined to fail the inspection in defect inspection, areas where poor displaying occurs with flakes, clusters, and dots appearing in the to-be-inspected display panel cannot be inspected by inspection staffs merely through visual inspection as a result of a spatial color mixing effect of human eyes. In this application, the difference image is obtained by subtracting the high-frequency-removed image from the to-be-inspected image, so that the defective display areas of flakes, clusters, and dots can be linearly displayed. For example, the flake-shaped defective areas present an output edge contour, which facilitates observation of the defective areas by the inspection personnel. The inspection personnel need to mark a position where poor displaying occurs on the display panel to facilitate subsequent repair work of the display panel. However, the inspection personnel are incapable of effectively identifying some slightly poor displaying on the display panel. In this case, the obtained difference image is enhanced to obtain the enhanced image, so that the inspection personnel can mark the position where poor displaying occurs on the display panel according to the enhanced image, effectively improving the inspection accuracy and working efficiency of the inspection personnel.

Figure 5:
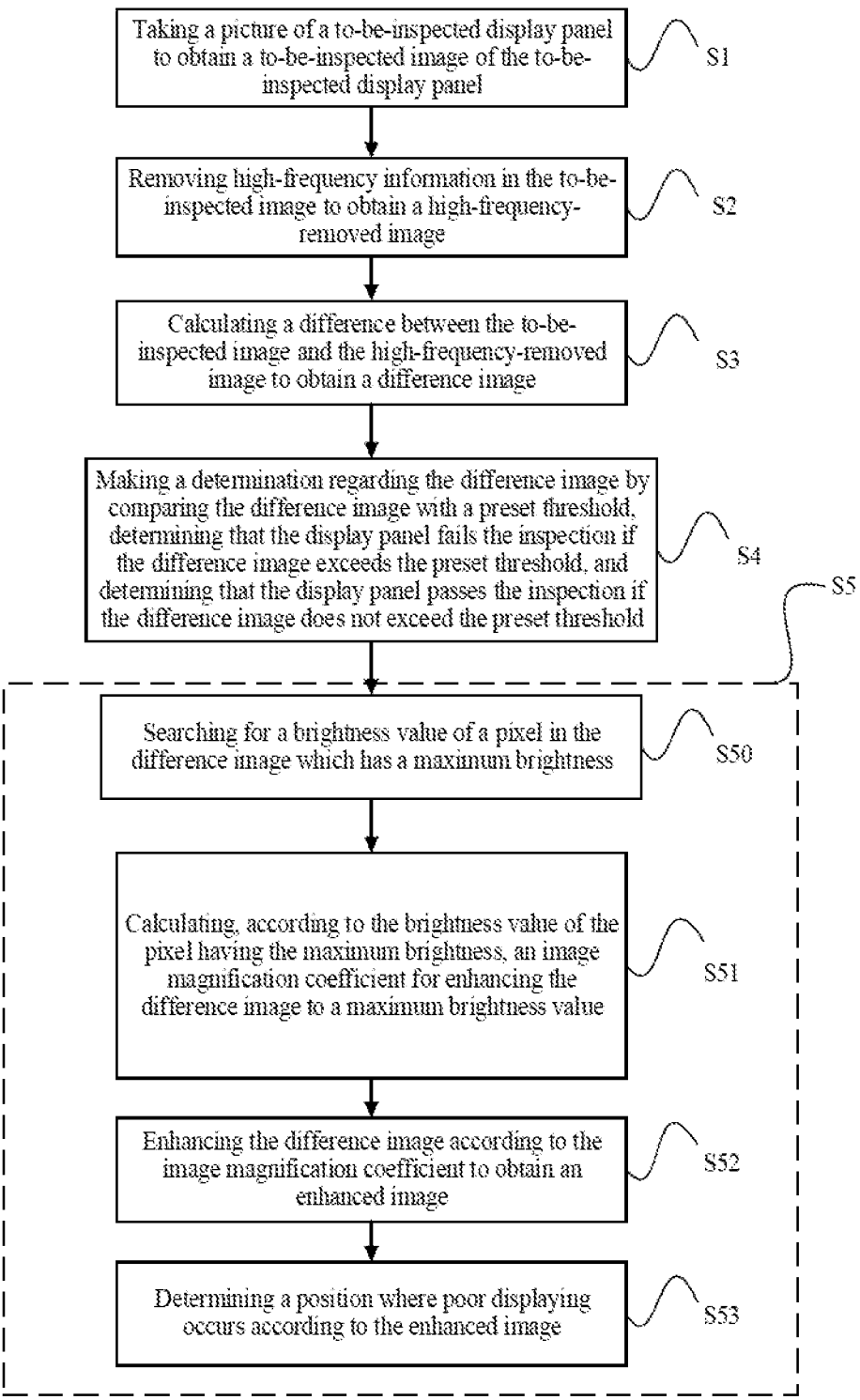
FIG. 5 is a schematic diagram of an inspection method for a display panel according to an embodiment of this application.

Referring to FIG. 5, FIG. 5 is a schematic diagram of an inspection method for a display panel according to an embodiment of this application. The step of enhancing the difference image to obtain an enhanced image, and determining a position where poor displaying occurs according to the enhanced image includes the steps of:

S50: searching for a brightness value of a pixel in the difference image which has a maximum brightness;

S51: calculating, according to the brightness value of the pixel having the maximum brightness, an image magnification coefficient for enhancing the difference image to a maximum brightness value;

S52: enhancing the difference image according to the image magnification coefficient to obtain an enhanced image; and S53: determining a position where poor displaying occurs according to the enhanced image.

Certainly, the step of enhancing the difference image to obtain an enhanced image, and determining a position where poor displaying occurs according to the enhanced image is not limited to the above. The enhanced image may also be obtained through other image enhancement methods to assist inspection personnel in inspection, for example: contrast transformation: linear transformation and nonlinear transformation; spatial filtering: image convolution operation, smoothing, and sharpening; color transformation: single-band color transformation and multi-band color operation; multispectral transformation: K-L transformation and K-T transformation; and image operation: interpolation operation, ratio operation, and a fractal algorithm.

Figure 6:
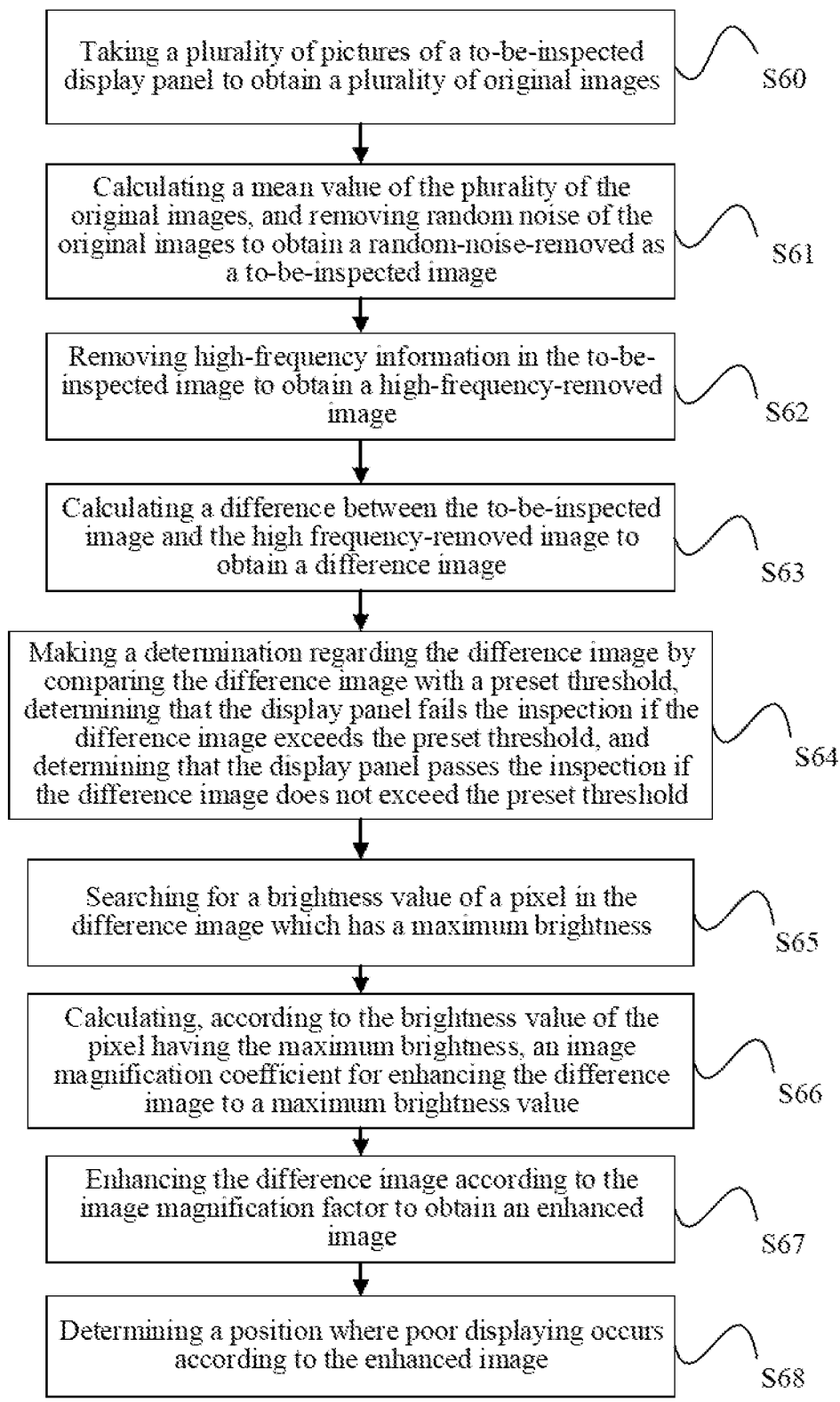
FIG. 6 is a schematic diagram of an inspection method for a display panel according to an embodiment of this application.

As shown in FIG. 6, another embodiment of this application discloses an inspection method for a display panel. The inspection method includes the steps of:

S60: taking a plurality of pictures of the to-be-inspected display panel to obtain a plurality of original images; and S61: calculating a mean value of the plurality of the original images, and removing random noise of the original images to obtain a random-noise-removed as the to-be-inspected image;

S62: removing high-frequency information in the to-be-inspected image to obtain a high-frequency-removed image;

S63: calculating a difference between the to-be-inspected image and the high-frequency-removed image to obtain a difference image;

S64: making a determination regarding the difference image by comparing the difference image with a preset threshold, determining that the display panel fails the inspection if the difference image exceeds the preset threshold; and determining that the display panel passes the inspection if the difference image does not exceed the preset threshold:

S65: searching for a brightness value of a pixel in a difference image which has a maximum brightness;

S66: calculating, according to the brightness value of the pixel having the maximum brightness, an image magnification coefficient for enhancing the difference image to a maximum brightness value;

S67: enhancing the difference image according to the image magnification coefficient to obtain an enhanced image; and S68: determining a position where poor displaying occurs according to the enhanced image.

During defect inspection on the display panel, in the inspection of the display panel through the above steps, inspection efficiency for the display panel and subsequent manual inspection efficiency of inspection personnel can be improved, and automation of the inspection process is also increased.

It should be noted that on the premise of not affecting the implementation of specific solutions, the descriptions of the steps in this solution shall not be construed as limiting the execution order of the steps. A step mentioned earlier that another step may be executed before, after, or concurrently with the another step.

The technical solutions of this application can be widely used in various display panels, such as a twisted nematic (TN) display panel, an in-plane switching (IPS) display panel, a vertical alignment (VA) display panel, a multi-quadrant vertical alignment (VA) display panel, or other types of display panels such as an organic light-emitting diode (OLED) display panel, all of which are applicable to the above solutions.

The foregoing contents are detailed descriptions of this application in conjunction with specific optional embodiments, and it should not be considered that the specific implementation of this application is limited to these descriptions. Persons of ordinary skill in the art can further make simple deductions or replacements without departing from the concept of the present application, and such deductions or replacements should all be considered as falling within the protection scope of the present application.

What is claimed is:

1. An inspection method for a display panel, the inspection method comprising the steps of:
taking a picture of a to-be-inspected display panel to obtain a to-be-inspected image of the to-be-inspected display panel;
removing high-frequency information in the to-be-inspected image to obtain a high-frequency-removed image;
calculating a difference between the to-be-inspected image and the high-frequency-removed image to obtain a difference image;
making a determination regarding the difference image by comparing the difference image with a preset threshold, determining that the display panel fails the inspection if the difference image exceeds the preset threshold, and determining that the display panel passes the inspection if the difference image does not exceed the preset threshold.

2. The inspection method for a display panel according to claim 1, wherein the step of taking a picture of a to-be-inspected display panel to obtain a to-be-inspected image of the to-be-inspected display panel comprises the steps of:
taking a plurality of pictures of the to-be-inspected display panel to obtain a plurality of original images; and
calculating a mean value of the plurality of original images, and removing random noise of the original images to obtain a random-noise-removed image as the to-be-inspected image.

3. The inspection method for a display panel according to claim 1, wherein in the step of removing high-frequency information in the to-be-inspected image to obtain a high-frequency-removed image, low-frequency filtering is performed on the to-be-inspected image, and the low-frequency filtering is mean filtering.

4. The inspection method for a display panel according to claim 1, wherein in the step of removing high-frequency information in the to-be-inspected image to obtain a high-frequency-removed image, each pixel point in the high-frequency-removed image is calculated by using the following formula:

$$F12(x,y)=(F11(x-1,y-1)+F11(x,y-1)+F11(x+1,y-1)+F11(x-1,y)+F11(x,y)+F11(x+1,y)+F11(x-1,y+1)+F11(x,y+1)+F11(x+1,y+1))/9,$$ wherein F12 represents a pixel point in the high-frequency-removed image, and F11(x,y) represents a pixel point in the middle of a 3*3 pixel cell of the to-be-inspected image.

5. The inspection method for a display panel according to claim 1, wherein in the step of removing high-frequency information in the to-be-inspected image to obtain a high-frequency-removed image, the filtering is one of median filtering, adaptive Wiener filtering, and wavelet denoising.

6. The inspection method for a display panel according to claim 1, wherein in the step of calculating a difference between the to-be-inspected image and the high-frequency-removed image to obtain a difference image, the high-frequency-removed image is subtracted from the to-be-inspected image to obtain the difference image.

7. The inspection method for a display panel according to claim 1, wherein in the step of making a determination regarding the difference image by comparing the difference image with a preset threshold, determining that the display panel fails the inspection if the difference image exceeds the preset threshold, and determining that the display panel passes the inspection if the difference image does not exceed the preset threshold, the threshold is a threshold matrix, thresholds in the threshold matrix correspond to pixels in the difference image in a one-to-one manner, each of the pixels in the difference image is compared with the threshold in the threshold matrix which corresponds to the pixel, and the display panel is determined to fail the inspection if the pixel of the difference image exceeds the threshold in the threshold matrix which corresponds to the pixel, and the display panel is determined to pass the inspection if the pixel of the difference image does not exceed the threshold in the threshold matrix which corresponds to the pixel.

8. The inspection method for a display panel according to claim 1, wherein following the step of making a determination regarding the difference image by comparing the difference image with a preset threshold, determining that the display panel fails the inspection if the difference image exceeds the preset threshold, and determining that the display panel passes the inspection if the difference image does not exceed the preset threshold, the inspection method further comprises the step of: enhancing the difference image to obtain an enhanced image, and determining a position where poor displaying occurs according to the enhanced image.

9. The inspection method for a display panel according to claim 8, wherein the step of enhancing the difference image to obtain an enhanced image, and determining a position where poor displaying occurs according to the enhanced image comprises the steps of:
searching for a brightness value of the pixel in the difference image which has a maximum brightness;
calculating, according to the brightness value of the pixel having the maximum brightness, an image magnification coefficient for enhancing the difference picture to the maximum brightness value;
enhancing the difference image according to the image magnification coefficient to obtain the enhanced image; and
determining the position where the poor displaying occurs according to the enhanced image.

10. An inspection method for a display panel, the inspection method comprising the steps of:
taking a picture of a to-be-inspected display panel to obtain a to-be-inspected image of the to-be-inspected display panel;
removing high-frequency information in the to-be-inspected image to obtain a high-frequency-removed image;
calculating a difference between the to-be-inspected image and the high-frequency-removed image to obtain a difference image;
making a determination regarding the difference image by comparing the difference image with a preset threshold, determining that the display panel fails the inspection if the difference image exceeds the preset threshold, and determining that the display panel passes the inspection if the difference image does not exceed the preset threshold;
searching for a brightness value of a pixel in the difference image which has a maximum brightness;
calculating, according to the brightness value of the pixel having the maximum brightness, an image magnification coefficient for enhancing the difference picture to a maximum brightness value;
enhancing the difference image according to the image magnification coefficient to obtain the enhanced image; and
determining a position where poor displaying occurs according to the enhanced image.

11. The inspection method for a display panel according to claim 10, wherein the enhanced image is obtained through one of contrast transformation, spatial filtering, color transformation, multi-spectrum transformation, and image operation.

* * * * *